(12) United States Patent
Reibel

(10) Patent No.: US 7,835,343 B1
(45) Date of Patent: Nov. 16, 2010

(54) CALCULATING TRANSMISSION ANTICIPATION TIME USING DWELL AND BLANK TIME IN SPREAD SPECTRUM COMMUNICATIONS FOR SECURITY SYSTEMS

(75) Inventor: Jean-Michel Reibel, Strasbourg (FR)

(73) Assignee: RSI Video Technologies, Inc., White Bear Lake, MN (US)

( * ) Notice: Subject to any disclaimer, the term of this patent is extended or adjusted under 35 U.S.C. 154(b) by 1035 days.

(21) Appl. No.: 11/389,673

(22) Filed: Mar. 24, 2006

(51) Int. Cl.
*H04J 3/06* (2006.01)
(52) U.S. Cl. .................. 370/350; 370/310; 370/324; 370/311; 370/318
(58) Field of Classification Search .............. 455/410, 455/445; 370/347, 350, 310, 324, 311, 318
See application file for complete search history.

(56) References Cited

U.S. PATENT DOCUMENTS

| | | | |
|---|---|---|---|
| 4,857,912 A | 8/1989 | Everett, Jr. et al. | |
| 5,448,290 A | 9/1995 | Van Zeeland | |
| 5,703,368 A | 12/1997 | Tomooka et al. | |
| 5,819,124 A | 10/1998 | Somner et al. | |
| 6,271,752 B1 | 8/2001 | Vaios | |
| 6,411,209 B1 | 6/2002 | Lyons et al. | |
| 6,476,858 B1 | 11/2002 | Ramirez Diaz et al. | |
| 6,504,479 B1 | 1/2003 | Lemons et al. | |
| 6,636,738 B1 * | 10/2003 | Hayashi ............. | 455/450 |
| 6,690,414 B2 | 2/2004 | Lyons et al. | |
| 6,700,487 B2 | 3/2004 | Lyons et al. | |
| 6,759,957 B2 | 7/2004 | Murakami et al. | |
| 7,151,945 B2 * | 12/2006 | Myles et al. ............. | 455/502 |
| 2002/0171557 A1 | 11/2002 | Wegener | |
| 2003/0065407 A1 | 4/2003 | Johnson et al. | |
| 2003/0193563 A1 | 10/2003 | Suzuki | |
| 2003/0202117 A1 | 10/2003 | Garner | |
| 2004/0109059 A1 | 6/2004 | Kawakita | |

(Continued)

FOREIGN PATENT DOCUMENTS

DE 101 50 745 A 1  4/2003

(Continued)

OTHER PUBLICATIONS

Sandor Csibi and Laszlo Gyorfi, Random Time and Frequency Hopping for Unslotted Asynchronous Access, Aug. 1996, IEEE 0-7803-3567-8/96/$5.00.*

(Continued)

*Primary Examiner*—Huy Phan
*Assistant Examiner*—Vladimir Magloire
(74) *Attorney, Agent, or Firm*—Crawford Maunu PLLC

(57) ABSTRACT

A building-security method is implemented in a variety of embodiments. In one such embodiment, the building-security method is implemented for bidirectional, wireless communication between a control panel device and peripheral devices. Each of the devices includes a wireless communication circuit to effect wireless communications. The control panel wirelessly sends synchronization information to at least one of the peripheral devices. Power consumption is reduced for at least one of the wireless communication circuits by coordinating a communications time interval and a selected channel for communication between the control panel device and the peripheral device to effect wireless communications between the control panel and the peripheral device. The selected channel is one channel from a sequence of channels used for wireless communications between the control panel device and the peripheral devices.

8 Claims, 7 Drawing Sheets

U.S. PATENT DOCUMENTS

| | | | |
|---|---|---|---|
| 2004/0155781 A1 | 8/2004 | DeOme | |
| 2004/0190467 A1* | 9/2004 | Liu et al. | 370/311 |
| 2004/0205823 A1 | 10/2004 | Tsai | |
| 2004/0205824 A1 | 10/2004 | Tsai | |
| 2004/0239497 A1* | 12/2004 | Schwartzman et al. | 340/539.1 |
| 2005/0024206 A1 | 2/2005 | Samarasekera et al. | |
| 2005/0134450 A1 | 6/2005 | Kovach | |
| 2005/0134454 A1 | 6/2005 | Eskildsen | |

FOREIGN PATENT DOCUMENTS

| | | |
|---|---|---|
| EP | 676 733 A | 10/1995 |
| EP | 811 959 A | 12/1997 |
| EP | 0 856 826 A2 | 8/1998 |
| EP | 1 115 264 A2 | 7/2001 |
| EP | 1 363 260 A1 | 11/2003 |
| EP | 1 499 098 A1 | 1/2005 |
| EP | 1 316 933 B1 | 8/2006 |
| GB | 2 325 548 A | 11/1998 |
| GB | 2 358 504 A | 7/2001 |
| JP | 01236397 A | 9/1989 |
| JP | 11154292 | 6/1999 |
| JP | 2003233889 | 8/2003 |
| JP | 2005071064 | 3/2005 |
| WO | WO 88/07474 | 1/1988 |
| WO | WO 00/03367 | 1/2000 |
| WO | WO 02/46919 A2 | 6/2002 |
| WO | WO 2004/064355 A2 | 7/2004 |
| WO | WO 2004/079684 A1 | 9/2004 |
| WO | WO 2004/114648 A2 | 12/2004 |
| WO | WO 2005/065196 A2 | 7/2005 |

OTHER PUBLICATIONS

Shreharsha Rao, SWRA041: Implementing a Bidirectional Frequency Hopping Application With TRF6903 and MSP430, Sep. 2004, Texas Instruments.*

Shreharsha Rao, SWRA039: Implementing a Bidirectional Wireless UART Application With TRF6903 and MSP430, Sep. 2004, Texas Instruments.*

* cited by examiner

Short Message Frames

Preamble Frame

| Learn | Learn | Synch | Type | Last | Counter | Syst_id_lo | Syst_id_hi |
|---|---|---|---|---|---|---|---|
| 01010101 | 01010101 | 11111 | 01 | x | ccccc | | |
| 1 byte | 1 byte | 1 byte | | | 1 byte | 1 byte | 1 byte |

Data Frame

| Synch | Type | Counter | Data1 | Data2 | Data3 | CRC |
|---|---|---|---|---|---|---|
| Learn | | | | | | |
| 010 | 11111 | 01 | cccccc | | | |
| 1 byte | 1 byte | | 1 byte | 1 byte | 1 byte | 1 byte |

FIG. 5

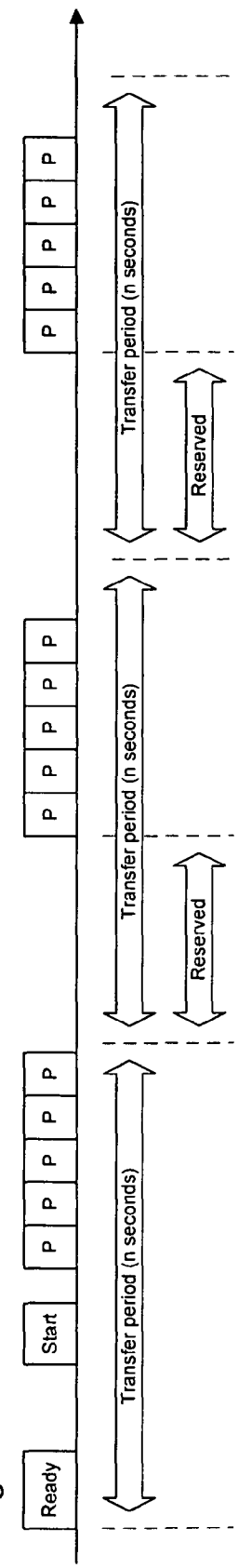

CALCULATING TRANSMISSION ANTICIPATION TIME USING DWELL AND BLANK TIME IN SPREAD SPECTRUM COMMUNICATIONS FOR SECURITY SYSTEMS

FIELD OF THE INVENTION

The present invention relates generally to approaches to wireless spread spectrum communications and more particularly to a spread spectrum communications system for use in a building-security system.

BACKGROUND

Home, office and other building-security systems are often used for safeguarding valuable possessions and for personal protection. These systems are typically implemented using different monitoring devices, such as cameras, motion sensors, keypads or contact sensors. Many buildings have multiple locations that are monitored for security purposes, requiring multiple monitoring devices in the different locations. For increased security and functionality, the monitoring devices can be configured to communicate with one or more central control devices. The central control device can, among other things, perform monitoring or recording functions, determine whether the building-security has been breached and whether to contact security personnel.

One method of communicating between the monitoring devices and the central control device is by a physical connection, such as electrical or other wiring. Using wiring to establish communication between the security devices can be troublesome for a number of reasons, such as the high cost of installation and maintenance. For example, exposed wiring is often unacceptable in a building, and thus, the installation of the security system requires passing the wires through the walls of the building. This type of installation can significantly increase the time required to complete a security system installation. Moreover, the troubleshooting and repair of the security system can be difficult because there is limited access to the unexposed wiring. The cost of the wire is another factor, especially in large buildings requiring numerous monitoring devices.

One potential solution is to use wireless monitoring devices to reduce or eliminate the need for physical connections between the devices, however, wireless security systems also have a set of problems, such as battery life. Ideally, the security devices would be self-powered by, for example, a battery. Self-powered devices are more secure because they are not subject to failure upon loss of power to the building. They also require less installation problems because they do not need to be connected to a separate power source; however, self-powered devices often have reliability issues due to the finite life of their power source. Increasing the useable time of a power source reduces the cost for replacement of the power source and increases the security of the entire system by having less potential downtime of the system or its components. Several recent developments have increased the potential power requirements of wireless security devices.

For example, the use of wireless communications in home, office and other buildings has been steadily increasing, creating additional issues with wireless security systems. One such issue is the increased potential for corrupted data due to interference between different wireless communications devices. This issue may also be present when an unauthorized person attempts to disrupt the security system by "jamming" the wireless communications using a wireless interference device. Techniques exist for reducing unwanted interference, however, the implementation of some of the techniques result in increased power requirements. Two such techniques, both of which can result in increased power requirements, include increasing the power of the transmission or varying the frequency of the transmission.

Another problem with power requirements arises from the desire to have increased monitoring capabilities with smaller devices. As security systems become more advanced, the power requirements of the monitoring devices are often increased. For instance, monitoring devices that contain digital cameras require enough power to run the camera, to store the digital picture in memory and to transmit the digital picture to the control device. The increased functionality of the monitoring devices, along with the desire to have smaller, less noticeable devices with less room for batteries or other power sources, has impacted the reliability of the monitoring devices.

Implementing a wireless building-security system can be further complicated by industry or government regulations. One such set of regulations is imposed by the Federal Communications Commission (FCC). The current regulations cover numerous aspects of wireless communications systems including, but not limited to, a range of restricted frequencies, a minimum number of different hopping frequencies within the allowable frequencies, the maximum output power of a transmitter and a requirement related to equal use of the hopping frequencies.

Attempts have been made to implement wireless security systems using a variety of methods. One such method is taught by European Patent No. EP 1 363 260 filed on May 6, 2003, entitled "Procédé de communication radiofréquence entre plusieurs dispositifs et système de surveillance mettant en oeuvre un tel procédé," which is fully incorporated herein by reference. Yet, these methods still leave room for improvement.

These and other issues have presented challenges to the implementation of wireless communication devices, including those involving building-security systems and similar applications.

SUMMARY

The claimed invention is directed to overcoming the above-mentioned challenges and others related to a variety of security systems. The present invention is exemplified in a number of implementations and applications, some of which are summarized below.

Various example embodiments of the present invention are directed to a wireless-building-security system and to a method for decreasing power consumption by the wireless components of the security system.

In one embodiment of the present invention, a method for use in a building-security system uses bidirectional wireless communication between a control panel device and peripheral devices. Each of the devices includes a wireless communication circuit to effect wireless communications between the control panel device and the peripheral devices. Synchronization information is wirelessly sent between the control panel and at least one of the peripheral devices. Power consumption is reduced for at least one of the wireless communication circuits by coordinating a communications time interval and a selected channel for communication between the control panel device and said at least one of the peripheral devices to effect wireless communications between the control panel and said at least one of the peripheral devices. The selected channel is one of a sequence of channels used for wireless communications between the control panel device and the peripheral devices. At least one of the devices relies on a limited power source. The control panel device collects building-security data from the peripheral devices while mitigating power consumption from the limited power source.

In another example embodiment of the present invention, a method for use in a building-security system is implemented for wireless communication between a control panel device and peripheral devices. Each of the devices includes a wireless communication circuit to effect wireless communications between the control panel device and the peripheral devices. Communication intervals that define communication between at least one of the peripheral devices and the control panel are provided along with a selected frequency for communicating between the devices. Communication is established between the peripheral device and the control panel using the communications interval and the selected frequency. The power consumption of at least one of the wireless communication circuits is reduced as a function of the communications interval and the selected frequency. Moreover, at least one of the devices relies on a limited power source, and the control panel device collects building-security data from the peripheral devices while mitigating power consumption from the limited power source.

In another example embodiment a building-security system is implemented for wireless communication between a control panel device and peripheral devices. Each of the devices includes a wireless communication circuit to effect wireless communications between the control panel device and the peripheral devices. Communication intervals that define communication between at least one of the peripheral devices and the control panel are provided along with a selected frequency for communicating between the devices. Communication is established between the devices based on the communication intervals and the selected frequency, and power consumption is reduced in at least one of the devices as a function of the communication intervals and the selected frequency. Moreover, at least one of the devices relies on a limited power source, and the control panel device collects building-security data from the peripheral devices while mitigating power consumption from the limited power source.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which:

FIG. 5 shows the format of the transmission of short messages, according to another example embodiment of the present invention; and FIG. 6 shows the format of the transmission of long messages, according to another example embodiment of the present invention.

Figure 1:
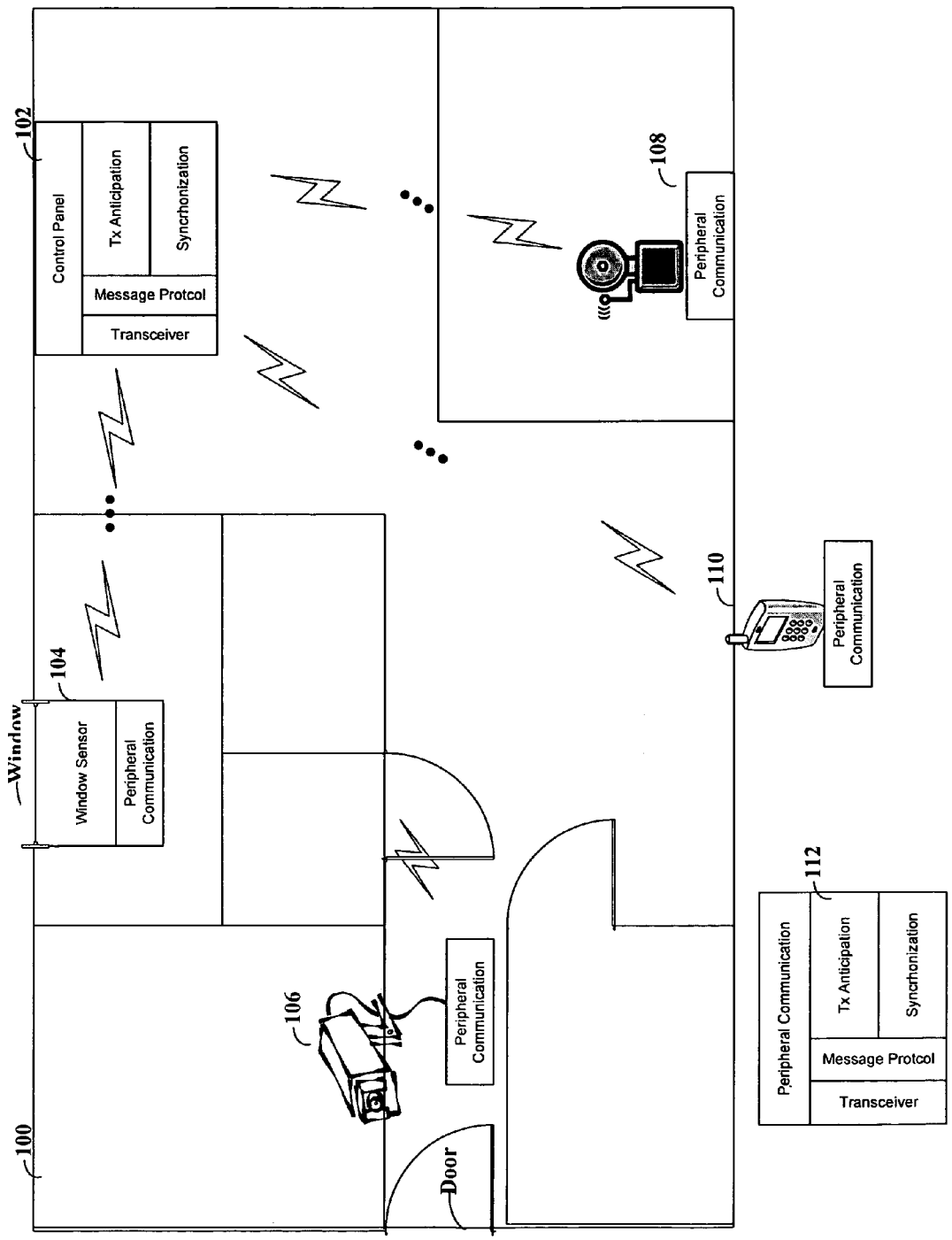
FIG. 1 shows a building-security system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different applications, and the invention has been found to be particularly suited for use in wireless building-security systems. While the present invention is not necessarily limited to such applications, various aspects of the invention may be appreciated through a discussion of various examples using this context.

The present invention is particularly useful in security systems that employ wireless communications between devices, some of which may have limited power sources, such as batteries, solar power or the like.

In one example embodiment of the present invention, a device used in a building-security system communicates wirelessly with another building-security device using a wireless communication circuit. The wireless communication circuit reduces the power consumption of at least one of the communicating devices by basing the wireless communications upon a communication interval and a selected frequency for communicating between the devices. For instance, the wireless communication circuit can use a communication interval and a selected frequency to increase the time the wireless communication circuit is in a power reduction or standby state.

Another example embodiment of the present invention includes a control device/panel and one or more peripheral devices. The control device and the peripheral devices are capable of bidirectional communications using wireless transmissions. The control device transmits a synchronization message to the peripheral devices and the peripheral devices use the synchronization message, in conjunction with a local clock, to coordinate transmission times. Additionally, the devices coordinate a frequency between themselves, from several frequencies used, which can be used to effect communications between the devices. The coordination allows the devices to minimize the active time of the transceiver of the devices, and accordingly, the power requirements.

In various embodiments, the active time is defined as the time when the wireless transceiver of the device is not in a standby or similar power-reducing state. The standby state may be accomplished by, for example, removing power from the receiving or transmitting portion of the transceiver or by reducing or ceasing the use of functions carried out by the device (e.g., signal amplification or signal processing functions).

A more specific example embodiment calculates a transmission anticipation time used by the transmitting device when beginning a transmission. The transmitting device determines the expected activation time of the intended receiving device based in part upon a communications period. The communications period may be represented by a repeating period of time during which communications between the devices takes place. During a communications period, the transmitting device uses the receiving device's expected receive activation time and the transmission anticipation time for determining a transmission activation time. The transmission activation time and the receive activation time represent times during which the communications devices activate their transceivers for transmitting or receiving wireless communications, respectively. This activation corresponds to the aforementioned active time.

FIG. 1 depicts a building-security system according to an example embodiment of the present invention. FIG. 1 includes building 100, control panel 102, and peripheral devices 104-110. The security system is implemented in such a manner so as to reduce the power consumption of one or more of the control panel and peripheral devices as related to the wireless communications between the devices. When implementing the wireless communications, the devices use multiple frequencies (channels) as well as communication intervals. The devices are able to reduce the power consumption by utilizing information regarding a specific frequency from the multiple frequencies used and the communication interval. For example, if the transmitting devices modify their transmissions based upon the information, a receiving device may reduce the power consumption by decreasing the time the receiving device is listening for a transmission from another device. By reducing the power consumption, the system lends itself to implementing bi-directional communications between the devices, which typically require more power consumption than unidirectional communications.

The jagged lines and ellipses found between control panel 102 and the peripheral devices represent wireless communications between the control panel and the peripheral devices. The wireless communications may be implemented using suitable frequencies. For instance, wireless communications frequencies in industrial, scientific and medical (ISM) radio bands (900 Mhz, 2.4 Ghz and 5.8 Ghz) have been found to be suitable for security systems; however, alternate frequencies may be implemented in accordance with the particulars of the system or its intended implementation.

The various elements of the peripheral devices and the control panel are implemented using one or more of electric circuit arrangements, processors, memory elements, software code, programmable logic devices, input/output interfaces or combinations thereof.

Building 100 represents a facility for which the building-security system is implemented. Common implementations of building 100 include, but are not limited to, residential homes, retail stores, office buildings, government buildings, museums and other facilities. Typically, the security system will monitor several locations within building 100. Accordingly, FIG. 1 depicts various peripheral devices throughout the building.

Peripheral communications devices 104-110 may take the form of a variety of different devices, a few of which are depicted in FIG. 1. For instance, device 104 depicts a window sensor that may, among other things, detect when the window has been opened or otherwise compromised; device 106 depicts a camera for video capture; device 108 depicts an alarm; and device 110 depicts a mobile peripheral, such as a key fob for interfacing with the control panel or another peripheral. These peripheral devices communicate with control panel 102 using wireless communications.

Block 112 depicts several elements that may be implemented in the peripheral devices, including a transceiver block, a message protocol block, a synchronization block and a transmit (Tx) anticipation block. Various embodiments of the present invention use one or more of these blocks. In one such embodiment, a peripheral device wirelessly transmits a signal using the transceiver block. The peripheral device uses information regarding a transmission period and the listening channel of the control panel in the transmission process.

In one embodiment, the peripheral devices transmit building-security information to the control panel. For instance, device 106 might transmit video images or device-status information to the control panel, while device 104 might transmit information relating to the window's sensor.

FIG. 1 depicts control panel 102 as including a transceiver block, a message protocol block, a synchronization block and a transmit (Tx) anticipation block. Various embodiments of the present invention use one or more of these blocks. In one such embodiment, the transceiver block is used for receiving signals from one of the peripheral devices as a function of the communication intervals and the frequency the control panel uses to listen for transmissions. The listening frequency is one of several potential frequencies available for communication between the peripheral devices and the control panel. For instance, the system may use a number of contiguous frequency slots (channels) within a suitable frequency band. One example of such a use includes 25 or more channels within the ISM frequency band from 902-928 MHz. Numerous other combinations of channels and frequency bands are possible using the present invention.

Typically, the control panel and peripherals are implemented using a similar set of elements as depicted by blocks 102 and 112; however, various components may be implemented differently. For instance, the synchronization block can be implemented differently in the control panel versus the peripheral devices where the control panel provides synchronization information to each of the peripherals and the peripherals must use the synchronization information to maintain synchronization using a local clock. In such an instance, the peripherals would compare the synchronization information with the local clock in order to compensate for any difference between the peripherals' time frames and the control panel's time frame. The synchronization information can take the form of a time index, such as a counter value, a current time of day or any other time based data which the peripheral can use as a reference for synchronization. In another example, the time index can be a reference within each message transmitted. Using such a system the peripheral device can compare when the message was received to when the message was expected. The peripheral device may also be configured to adjust the local clock using a compensation for a timing error. For instance, if the peripheral clock appears to be running slower than the control panel, the peripheral can compensate by increasing the clock frequency or using a counter to compensate for the differences between clocks.

The control panel and the peripheral blocks are depicted as having a transceiver; however, the system may be implemented using variations of receivers and transmitters. In some instances, a peripheral may be implemented with only a transmitter. In other instances, a peripheral may be implemented with only a receiver. Other implementations allow for one or more of the control panels and peripherals to have both a transmitter and receiver (transceiver). Thus, transceiver is used herein to describe a receiver, transmitter or both a receiver and transmitter.

One embodiment of the present invention reduces the power of one of the devices as a function of the listening channel and a communications period. The system decreases the length of time that a receiver is active by using the communications period and listening channel to reduce the window of time necessary to receive the start of a transmission. When the receiver is not active, various methods of power reduction are employed, such as removing power from the receiving devices or reducing or stopping selected functions (e.g., amplification or processing).

Another embodiment synchronizes the various peripheral devices with the control panel. The synchronization can further reduce the active time of the transmitter because, for example, the transmitter may limit the transmission times relative to the times for which the receiver is active. Such a reduction can be accomplished because, for example, in many systems the transmission time cannot be shorter than the Rx activation period of the receiver without knowledge of when the Rx activation occurs; however, synchronization can reduce the transmission times to less than the Rx activation period of the receiver.

In a specific example, the control panel sends periodic synchronization messages to the peripheral devices. A peripheral device that determines it has lost synchronization with the control panel can increase the active time of the receiver to compensate for the loss in synchronization. In the event that the peripheral device is no longer receiving synchronization messages, the device can increase the active receive time to ensure that a transmission from the control panel will be received. The peripheral device can increase the activation time based upon an expected accuracy of the local tracking (e.g., local clock) of the control panel time-base. For instance, where the expected accuracy of the local tracking is relatively high, the peripheral device increases the activation time only upon the loss of several synchronization messages.

Some devices, such as a keyfob or other handheld device (110), are portable and are often removed from the wireless communication range of the rest of the system or may cease to receive or transmit information in response to a period of inactivity. Thus, the portable devices often lose synchronization during the time they are unable to communicate with the control panel. Accordingly, such portable devices frequently increase the activation time to compensate for the lack of synchronization between the portable devices and the control panel. The frequent increase in activation time often leads to a high rate of power consumption. To compensate, portable devices can be implemented to shut down transmission monitoring efforts until an external action occurs, such as a button being pressed.

In one embodiment of the present invention, the messages sent by the control panel are received by multiple peripheral devices simultaneously. Where the message is not intended for all the peripherals, the message can include information that indicates for which peripheral the message is intended. The message can also indicate a channel that the control panel listens for an acknowledge message from the peripheral.

Figure 1A:
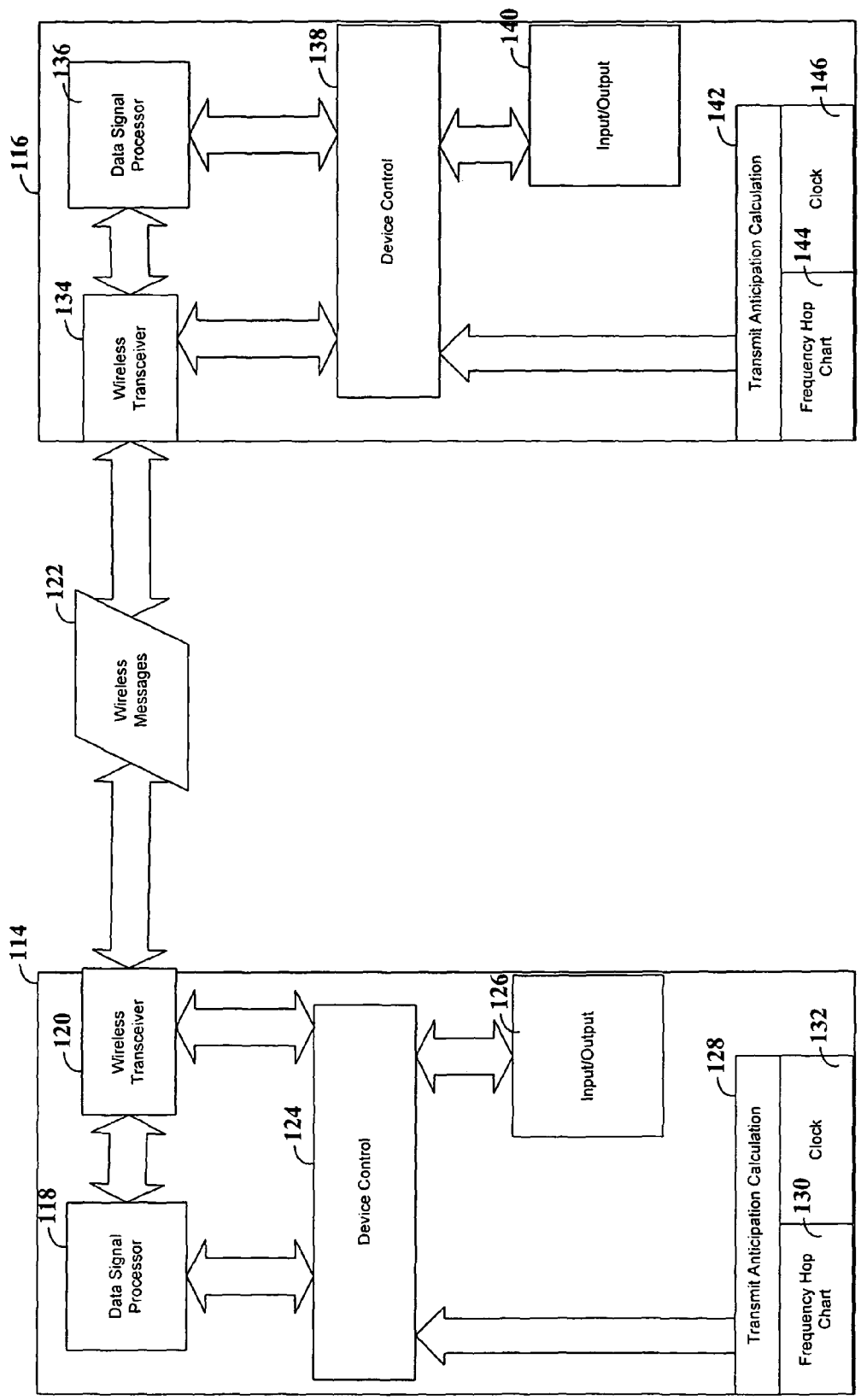
FIG. 1A shows a block diagram of two wireless communication devices, according to another example embodiment of the present invention.

FIG. 1A depicts an example embodiment of two wireless communication devices used in the security building system of FIG. 1. FIG. 1A includes several components contained within wireless devices 114 and 116. These wireless devices correspond to example embodiments of the peripheral and control panel devices of FIG. 1.

Wireless transceivers 120 and 134 transmit information from one device to the other via wireless communications. Wireless messages 122 represent the information communicated between the wireless devices and typically carry various forms of data used in maintaining the security system. For example, wireless device 114 may receive data from Input/Output (I/O) 126 and transmit the data to wireless device 116.

Prior to transmission and upon receipt of the data, the information is processed by data signal processors 118 and 136.

Device control blocks 124 and 138 reduce the power of wireless devices by controlling the function of the transceivers. To this end, a control block receives a transmit anticipation indication as depicted in blocks 128 and 142. This transmit anticipation calculation is based upon the clock circuit (132 or 146) and the frequency-hop chart (130 or 144).

The clock circuit may be used to determine the expected active time of the receiving transceiver. In one embodiment, one or more of the wireless devices send messages providing synchronization information. The wireless devices use the synchronization information to synchronize the transmission and receive periods of the devices. The synchronization may be implemented using various methods, some of which may include transmitting the current time of day as determined by one of the devices between the devices, transmitting timing information relating to the current transmission period as determined at one of the devices, transmitting a value subject to change with respect to time (e.g., a counter) or receiving synchronization information from an external source other than the wireless devices.

Input/Output blocks 140 and 126 represent optional interfaces for sending and receiving data other than through wireless communications. For instance, the devices may have a camera, a local display, a local speaker for an alarm, Ethernet, telephone or other communication outputs.

The frequency-hop chart represents the possible channels used for wireless communication as well as the order with which the channels are used. In one embodiment, the frequency-hop chart is represented by values stored in a memory or similar circuit. In another embodiment, the frequency-hop chart may be an algorithm that is used to determine the current or future channel based upon known factors. For instance, the algorithm may provide the channel based upon the current time.

In response to the transmission anticipation time, the control activates the transceiver to begin transmitting. This process allows for one or more of the wireless communications devices to reduce their power consumption. For instance, the synchronization and transmit anticipation times allow the control blocks to decrease the time the transceivers are in an active state and place the transceivers (and possibly other related functions) in a state where the power consumption of the devices is less than the power consumption of the active state.

Figure 2:
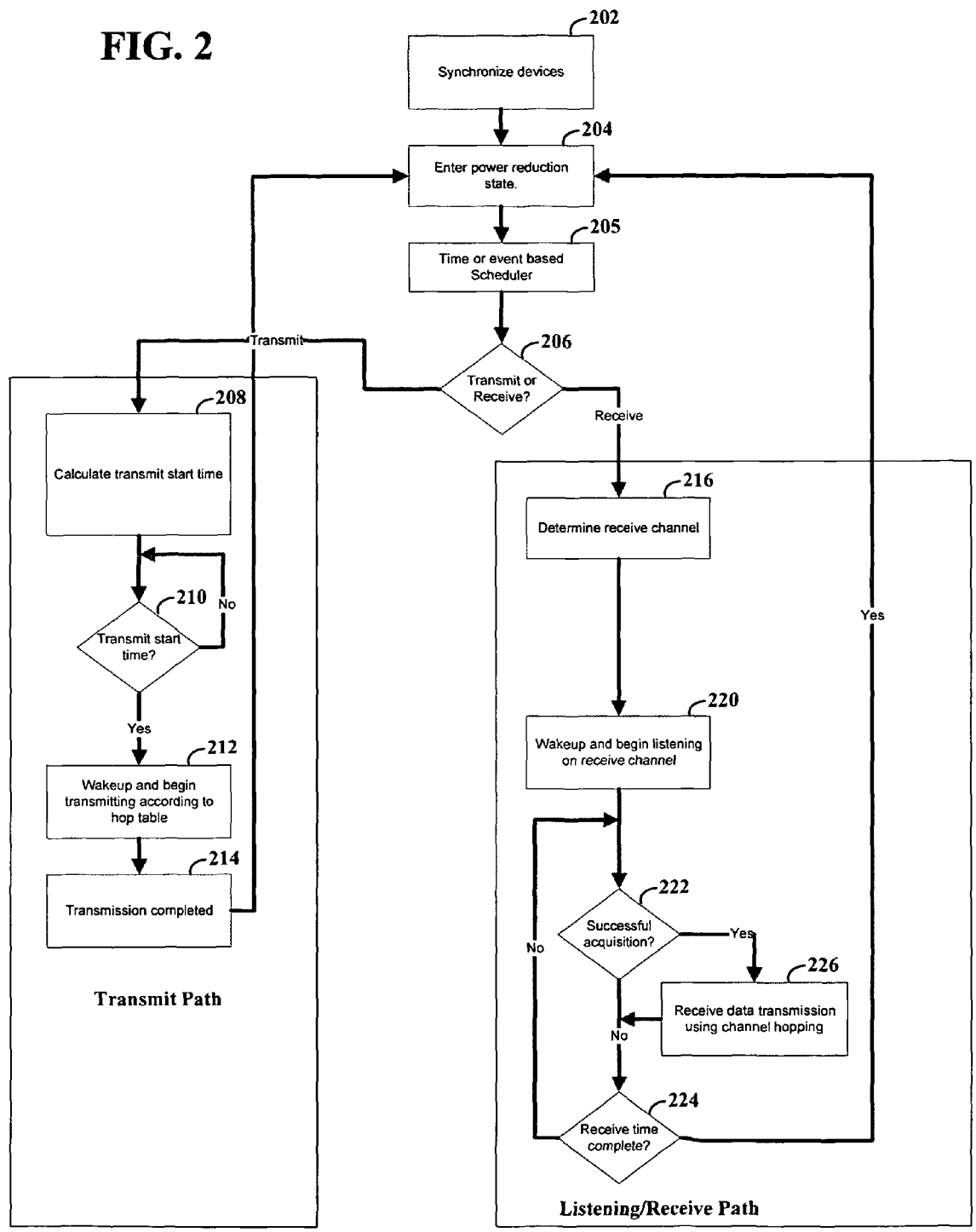
FIG. 2 shows a flow chart for a method of communication between communication devices in a building-security system, according to another example embodiment of the present invention.

FIG. 2 depicts an example method according to another embodiment of the present invention. The method of FIG. 2 may be implemented using two or more wireless devices for use in a building-security system. The devices synchronize with respect to each other or with respect to an independent time source as depicted at block 202. This synchronization step is shown as the first step in the process; however, the devices may synchronize after one or more transmissions, or they may synchronize periodically.

When the devices are not actively transmitting, receiving or listening, they are typically in a power reduction state as depicted by block 204. A scheduler determines that the device will begin transmitting or listening/receiving based upon time-based or event-based criteria as shown by block 205. In response to determining that the device will begin transmitting or listening/receiving, the device begins either the transmit path or receiving path as depicted by the decision block 206. The device typically makes the determination based upon the configuration of the building-security system and the communication protocols. For example, a peripheral device may determine that it will begin transmitting upon receiving information from a sensor or other input, such as a window sensor being triggered. The control panel or peripheral may periodically determine that it will begin listening for any information transmitted from the other devices. Alternatively, a device may determine that it will begin listening/receiving for a response to a previous communication. Other examples of factors used in the determination include the need for synchronization messages, configuration of peripherals and requests for repeating corrupted data.

A transmitting device follows the transmit path to effect a transmission to another device. Prior to transmitting, the transmitting device calculates the transmit start time as shown at block 208. In one embodiment, the transmit start time is a function of the expected listening channel of the receiving device and the transmission period. In a more specific embodiment, the transmit start time may be calculated based upon the number of channels in a frequency sequence (frequency-hop table) between the current transmitting channel and the expected listening channel of the receiving device and the expected listening time the receiving device will begin listening on the expected listening channel (receive activation time).

As shown at block 210, the transmitting device determines whether the transmit start time has been met. The transmitting device bases the determination by, for example, a comparison of the transmit start time and the current time. Until the transmit time has been met, the transmitting device remains in the power reduction state. Once the transmit time has been met, the transmitting device enters a transmitting state and begins wireless transmissions as depicted in block 212. The transmitting device determines the transmission frequency using the frequency-hop table.

Typically, the receiving device recognizes the wireless transmission, and upon a successful acquisition phase, begins to track the transmitting device. The transmitting device then proceeds to transmit the desired message/data to the receiving device. Upon completion of the transmission as depicted in block 214, the transmitting device returns to the power reduction state as shown in block 204 and the process is repeated.

Similarly, a receiving device follows the listen/receive path to receive a transmission from another device. The receiving device first determines what channel to begin listening for a transmission as shown in block 216. This determination may be a known value stored in a local memory or an output provided from a circuit. Alternatively, the determination may be based upon other variable factors, such as a previous transmission time or data received from an input of the receiving device.

Typically, the receiving device will stay in the power reduction mode until the activation time. At or near the activation time, the receiving device leaves the power reduction mode to enable the device for the receipt of a transmission as depicted in block 220. The receiving device then continues to listen for a transmission until one of two conditions is met. The first condition is depicted by block 222 and represents the successful receipt and acquisition of a transmission from another device. The second condition is depicted by block 224 and represents a specified time frame during which the receiver is to remain active. If the receiving device determines that the second condition has been met, the receiving device returns to the power reduction state shown in block 204; however, if the receiving device determines that the first condition has been met, the transmission is received from the transmitting device as shown in block 226. Upon completion of the transmission, the receiving device resumes listening, unless the specified time frame of block 224 has been completed. If the time frame has been completed, the device returns to the power reduction state shown in block 226.

In one embodiment, one or more of the devices may only be capable of transmitting, and one or more of the devices may only be capable of receiving. Such devices would follow only the transmission or receiving path, respectively. In other embodiments the devices are capable of both transmitting and receiving and would follow the appropriate path.

Figure 3:
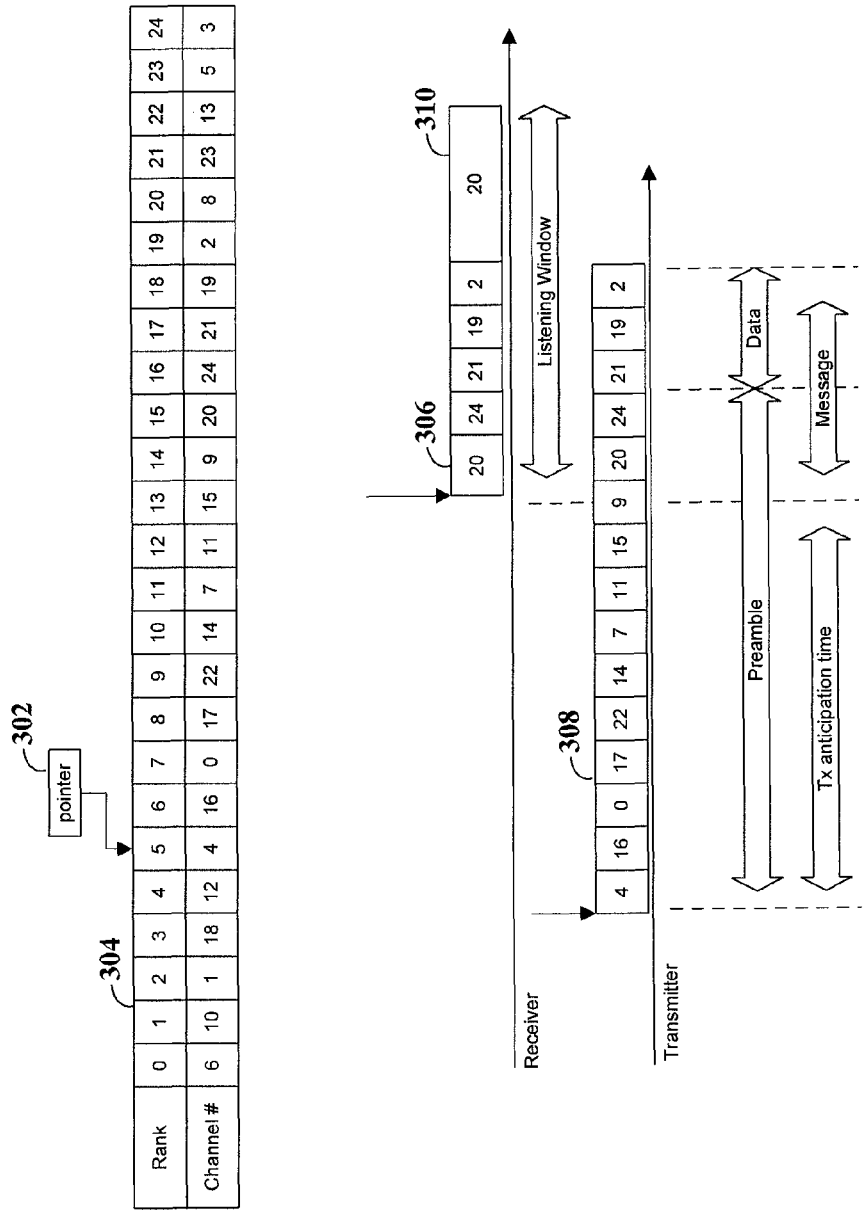
FIG. 3 shows an implementation of a transmit anticipation time and frequency-hop table, according to another example embodiment of the present invention.

FIG. 3 shows an implementation of the transmit anticipation time and frequency-hop table, according to another example embodiment of the present invention. The figure depicts frequency-hop table 304, its pointer 302 and the receiver and transmitter timelines.

Frequency-hop table 304 represents an order of frequency channels used by both the receiver and the transmitter to communicate. To increase security, decrease data loss and conform to (FCC) regulations, the order of the channels is typically pseudo-random. For instance, table 304 shows ranks 0-24 in the top row of the table. These ranks reflect the order of the channels used by the devices and correspond to the channel in the lower row of the table. The communicating devices would use the channels in the order provided. Thus, table 304 may be used in applications using frequency-hopping spread spectrum or similar techniques.

Pointer 302 represents the current channel to be used by the transmitting device. More specifically, a transmitting device begins transmitting according to the channel indicated by the pointer. In one embodiment, this channel represents the last channel used by the transmitting device or the channel immediately following the last channel used. This use of the pointer by a transmitting device ensures that the channels are utilized equally because the transmitting devices transmit according to the frequency-hop table.

The receiver and transmitter timelines depict the channels used by a receiver and transmitter as a function of time. In this example, time increases from left to right. The receiver begins listening at the start of the Rx activation as shown by the arrow and block 306. This represents the time at which the receiver is listening for a transmission from the transmitter. In this instance, the receiver is listening to channel 20, which corresponds to rank 15 of table 304.

The transmitter timeline depicts the transmitter beginning to transmit at the start of the Tx anticipation time as shown by the arrow at the start of the Tx anticipation time and block 308. The transmitter begins transmitting on the channel that corresponds to the pointer 302. In this instance, the pointer indicates rank 5 and channel 4. The transmitter changes frequency according to the wireless communications protocol being implemented and the table 304 as shown by block 308. The Tx anticipation time is the time the transmitter begins transmitting in relation to the Rx activation time. The Tx anticipation time is selected so that, during the Rx activation time, the transmitter is transmitting on the same channel to which the receiver is listening. If frequency-hopping spread spectrum is used, the Tx anticipation time is a function of the current rank determined by pointer 302 and the Rx activation channel of the receiver. More specifically, the anticipation time is calculated using the number of the channels in table 304 between the current rank and the Rx activation channel. This number is multiplied by the time the transmitter is active on any one channel (dwell time) plus the time required to switch to a new channel (blank time).

During the Tx anticipation time, the transmitter sends preamble frames as shown by the transmitter timeline from channel 4 to channel 9. After the transmitter reaches the transmit anticipation time, it transmits a preamble frame using the listening channel followed by the remainder of the message. The receiving device acquires the transmitter using the preamble frame and tracks the transmitter according to the frequency hop table, as shown on the receiver timeline. In an alternate embodiment, the transmitter transmits one or more preamble frames after transmitting the preamble frame using the listening channel. For example, FIG. 3 depicts preamble frames transmitted on the listening channel (20) and a subsequent channel (24). Using this method, the number of preamble frames can be increased so as to improve quality of the acquisition phase between the transmitter and the receiver.

The receiver continues listening on the channel until the listening window is over as shown by block 310. In some instances, the listening window may only be long enough to receive a single message resulting in a short active time of the receiver and a reduction in power consumption. For such instances, the listening shown by block 310 is not implemented. In other instances, the listening window may be longer to accommodate several messages, or devices which are not synchronized. For example, the control panel often requires a longer listening window because devices such as keyfobs lose synchronization.

In an alternate embodiment, the pointer can represent the last channel used by the receiving device or the channel immediately following the last channel used by the receiving device. For example, the control panel can implement a pointer for each peripheral device. When the control panel wishes to communicate with a receiving peripheral, the control panel begins transmitting on the channel indicated by the pointer that corresponds to the receiving peripheral. After a completed transmission, the control panel and the peripheral devices will use the next channel in the frequency-hop table. This use of pointers also ensures equal utilization of channels because the transmitter transmits according to the frequency-hop table for each peripheral. This embodiment is particularly useful for situations where the transmitting device is the only device that transmits to the receiving device as can sometimes be the case in a system where a control panel transmits to peripheral devices. Accordingly, an alternate scheme can be used for a peripheral device transmitting to a control panel.

Consistent with this embodiment, the transmitting device does not calculate a transmission anticipation time. Instead, the transmitting device begins transmitting on the channel indicated by the pointer at the Rx activation time because the first transmitting channel is the same as the receiving channel. Other methods can be used to determine the starting transmission channel. For example, the receiving channel can be periodically changed for each receiving device and the pointers at the transmitting device are changed accordingly. In some instances, transmissions using channels that have not been used equally can be added to balance the use of the channels, or the control panel can periodically send information to control the use of listening channels by the peripherals.

Figure 4:
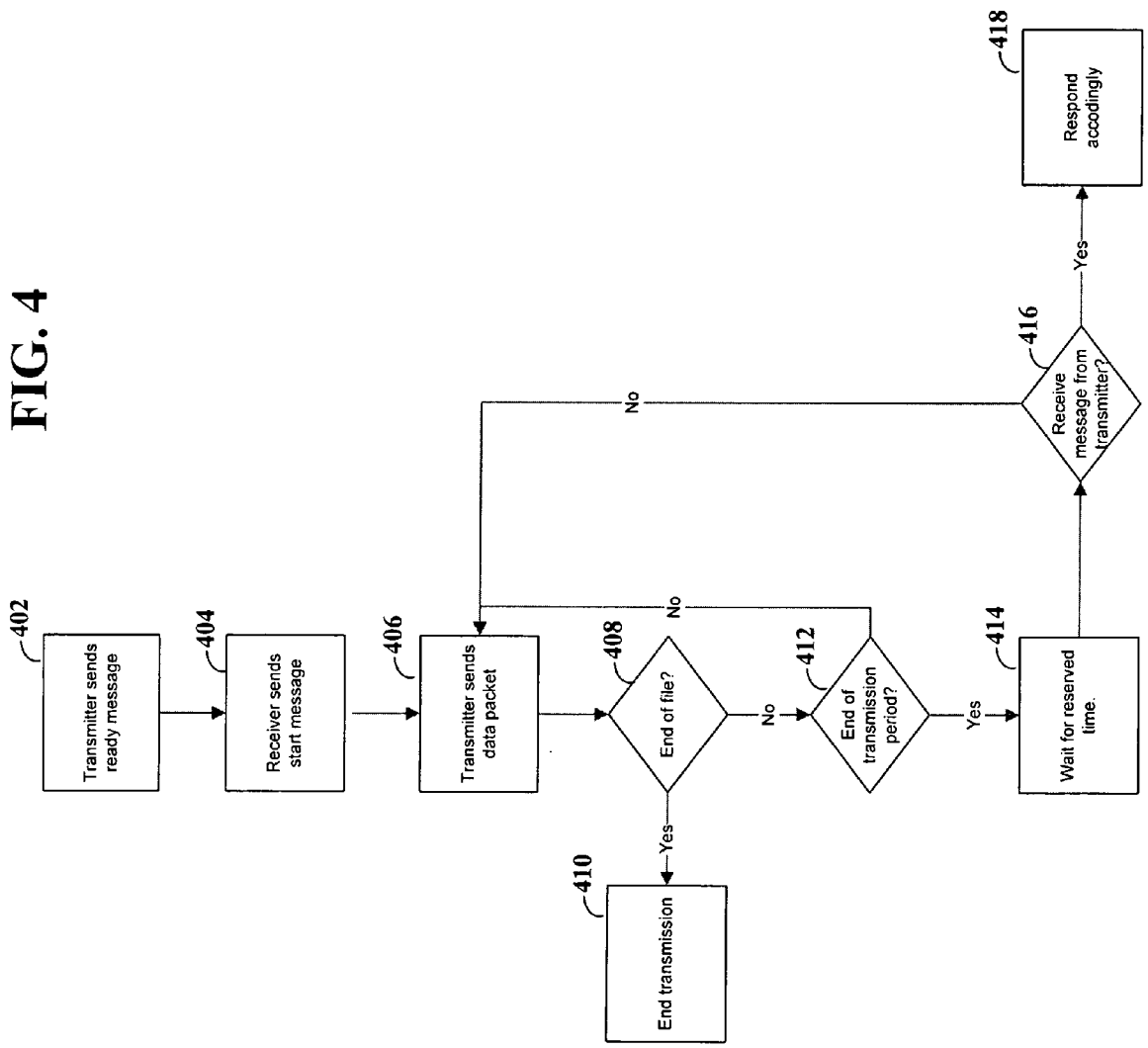
FIG. 4 is a flow chart for a method of transmitting data, in accordance with another example embodiment of the present invention.

FIG. 4 depicts a flow chart for a method of transmitting data in accordance with another example embodiment of the present invention. The method is particularly useful for controlling the transfer of data files large enough to require the use of many data packets. The method can be implemented to increase the throughput of the wireless communications link while allowing other communications during the transfer of a large data file. The increased throughput and other factors can also reduce the power consumption necessary for the transmission of the large data file.

In a typical embodiment, the peripheral device has one or more data files to transmit to the control panel. This situation should not be considered exclusive, as for example, the control panel or another peripheral may have one or more data files to transmit to a peripheral. The transmitting device sends an indication that a large data file is ready to be sent to the receiving device as depicted in block 402. When the receiving device is ready, the receiving device sends a start message to the transmitting device as shown in block 404.

The transmitting device sends consecutive packets (block 406) until one of two conditions (blocks 408 and 412) is met. The first condition is met after the entire file has been transmitted, and the transmission has been completed as shown in block 410. The second condition is met when the current transmission period has ended. Several embodiments of the present invention implement variations of the transmission period. For instance, it may be advantageous to limit the transmission period of a peripheral to the control panel so that other peripherals may communicate to the control panel. Alternatively, the transmission period may be limited to allow the transmitting or receiving device to perform processing of the data or other functions. In one such embodiment, the transmission period for large data transfers is limited to 812.5 ms out of 1 second intervals.

When the second condition is met, the transmitting device stops transmitting the file during the time reserved for other functions as depicted in block 414. In one embodiment, the receiving device can send a message to the transmitting device during this reserved period as shown in block 416. Upon receipt of such a message, the transmitting device can take appropriate action (block 418). For instance, the receiving block may alert the transmitting device of lost packets so that the transmitting device can send the lost packets a second time. If, however, the transmitting device does not receive a message from the receiving device, and the reserved time has passed, the transmitting device resumes sending packets as shown in block 406.

FIG. 5 and FIG. 6 depict a transmission format for short and long messages, according to another example embodiment of the present invention. The system implements the long or short messages depending upon the characteristics of the data to be transferred. For instance, one embodiment uses short messages for all peripherals control and status data and long messages for longer data structures like large files. The short messages are limited to a few bytes, while the long messages are used for data structures (or files) having many bytes. For instance, a long message might contain several hundred kilobytes (KB) of video, voice or other data.

A short message is built with 2 types of frames: preamble frames and data frames. Preamble frames are used at the beginning of each message during the acquisition stage of the transmission. The preamble frames include a bit pattern for assisting the receiver in locking onto a transmission as depicted by the "Learn" block of the short message preamble frame. The Learn block shows alternating bits 0 and 1, a common example of such a learning pattern. A received signal strength index measurement can also be achieved by the receiver to discriminate noise (when no transmission is present) from a real carrier. The preamble bits can also be used to determine the bit rate used by the transmitter and to verify that the bit rate corresponds to the expected bit rate. The preamble frame can also contain other types of information. For instance, the preamble may contain system identification bits that permit the receiver to verify that the current signal is originated from a known transmitter. The data frames follow the preamble frames. Typically, much of a data frame is dedicated for data (the "Data1", "Data2" and "Data3" fields) and ends with an error detection field, such as a cyclical-redundancy-check (CRC).

For longer data structures like large files, the message format is changed to allow a better usage of the bandwidth of the radio channel. While short messages can be implemented using variable length structures, the long messages are arranged in fixed length packets. In some instances, the file size can exceed 200 KB and can use a large part of the radio channel time. To maintain equal use of the channels, the long messages are transmitted using packets containing a number of data frames in multiples of the number of channels used by the communications devices. For instance, the system of FIG. 4 uses either 5 or 25 channels for communications because the long packet format has 25 frames and 5 and 25 are the only integer divisors (other than 1) of 25. Thus, when compared to the short message format, the long message format reduces the number of bytes used for communication overhead (e.g., preamble, sync pattern and CRC) in relation to the number of bytes used to transfer the file data. Additionally, the long messages can be implemented using longer frames to reduce the number of channels used to complete the file transfer. Since each change in channel includes a blank time, the total throughput of the transfer can be increased by reducing the number of changes in channels used throughout the file transfer. The advantages of the increased throughput must be balanced against the disadvantages of increasing the dwell time in order to increase the frame size. For example, increasing the dwell time can adversely affect the system's susceptibility to loss of data on a particular channel.

In one embodiment, the short and long message formats are implemented using the method of transmitting data depicted in FIG. 4 and the "Large File Transfer" (LFT) timeline of FIG. 6. The transmitting method is initiated by short messages (e.g., from the source and one from the control panel to start the transfer), as depicted by the ready and start blocks of the LFT timeline. The device receiving the large file handles the arbitration for the transmission method. To increase bandwidth, the receiving device does not send a short message every transfer period. Instead, the receiving device sends a short message periodically (e.g., every "n" seconds) or when a problem occurs with the transmission, such as when the amount of corrupted (lost) frames reaches a given level. The receiving device can request that the lost frames be resent. Thus, during the reserved period, the transmitting device listens for a message from the receiving device. If a short message is not received, the packet transmission resumes after the reserved time is complete.

According to another example embodiment, error recovery methods can be implemented depending upon the size of the data structure. For short messages, a simple redundancy scheme is used. Using the scheme, the transmitting device duplicates selected frames of the transmitted short message within the same packet. When using frequency-hop spread spectrum, the duplicate frames can be such that they are transmitted on different channels to avoid interference on a particular channel. Should a frame and its duplicate be lost, the receiving device can use a negative acknowledge message to request the message or frame be resent.

For large messages, duplicate frames are not transmitted unless the receiving device requests they be retransmitted. Each data frame contains a CRC field for error detection purposes. The receiving device uses the CRC field to detect lost frames and records the lost frames. When the number of lost frames exceeds a given level, the receiving device sends a short message indicating the lost frames using frame and packet numbers. To limit the impact of error in this short message, the frame and packet numbers are grouped in individual data frames (i.e., each data frame contains one frame and one packet number), permitting the error-free part of the short message to be used.

In one embodiment, the peripherals have their time period (Rx activation cycle) pre-programmed and stored in Flash memory. During an initialization phase, the peripherals transmit this period value to the control panel, and the control panel stores the period in memory. When a transmission is required from the control panel to the peripheral, the control panel uses the stored period value to determine the time at which the peripheral will be listening. This can facilitate communications by avoiding possible communication collisions between peripherals and by potentially utilizing more of the transmission period.

In an alternate embodiment, the control panel transmits the time period for each peripheral during an initialization phase. The peripheral and control panel use the transmitted time period for future communications.

In another embodiment of the present invention, individual messages are acknowledged by the recipient. If the sender does not receive a positive acknowledge message or a negative acknowledge message, the sender repeats the original message. To avoid collision between several senders trying to repeat a message, the devices delay their retransmissions. The delays are implemented by each sender to prevent simultaneous retransmissions by several devices. The delays may be implemented using various embodiments. One such embodiment differentiates the delays using a unique address for each device. For instance, one device has an address in binary form equal to 000011 while another device has the binary address equal to 000100. For each repetition, the sender will use a digit of the binary address to determine whether to insert a delay prior to repeating the message. For example, with the original message sent at second n and the binary address=000011:

$1^{st}$ retransmission: 1 second delay (the repetition occurs n+2 seconds)

$2^{nd}$ retransmission: 1 second delay (the repetition occurs n+4 seconds)

$3^{rd}$ retransmission: 0 second delay (the repetition occurs n+5)

$4^{th}$ retransmission: 0 second delay (the repetition occurs n+6)

$5^{th}$ retransmission: 0 second delay (the repetition occurs n+7)

$6^{th}$ retransmission: 0 second delay (the repetition occurs n+8)

Subsequent retransmissions: Repeat sequence starting at $1^{st}$ retransmission.

In another example embodiment, the frequency-hopping table used for channel selection is chosen from several tables stored in each device. During installation, the control panel will select one of the several tables. The tables may be selected randomly, or alternatively, they may be selected using a pre-programmed system. One such pre-programmed selection method uses a system identification number to select one of the tables. The peripherals use a default table (also known by the panel) until the system identification has been transmitted by the control panel. This can be advantageous where several similar systems are used in close proximity with each other allowing for different channel sequences of the various systems.

Within a given system, data can be corrupted when several peripherals transmit at the same time. To reduce the probability of corrupted data, messages can be delayed according to their importance or content for a fixed offset time. Alternatively, each peripheral may be configured to transmit low priority messages during a specified time that is different from the other peripherals.

To achieve a high level of security, one embodiment of the system uses cryptographic techniques. At installation phase, the control panel uses a master key (factory set) and a random value to generate a diversified key. The random value is transmitted to the peripherals during an initialization phase, and the peripherals generate the same diversified key. The control panel serial number is used as site identification and is also transmitted to the peripherals. A Message Authentication Check (MAC) is calculated for each message. To avoid replay of a previously transmitted message, the diversified key is again diversified using a time counter, so it will evolve every second.

The critical data sent over the air (like arming/disarming codes) is encrypted using a XOR operation with the result of the cryptographic operation. For example, cryptography can be used to generate a 128-bit encrypted string, used for either MAC field having 16 least-significant-bits or for XOR scrambling with all 128 bits.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include using variations of the functionality of the peripheral devices. Other changes may include implementing the security system for use in a boat, recreational vehicle (RV), camper, or other environments. Such modifications and changes do not depart from the true spirit and scope of the present invention, which is set forth in the following claims.

What is claimed is:

1. For use in a building-security system, a method for wireless communication between a control panel device and peripheral devices, each of the devices including a wireless communication circuit to effect wireless communications between the control panel device and the peripheral devices, the method comprising:

to effect wireless communications between the control panel device and at least one of the peripheral devices, providing communication intervals to define communication therebetween, the communications intervals defined as a function of a selected one of multiple frequencies for communicating between the control panel device and said at least one peripheral device;

communicating between the control panel device and said at least one peripheral device based on the communication intervals of at least said selected one of the multiple frequencies;

reducing power consumption in at least one of the control panel device and said at least one peripheral device as a function of the communication intervals and said selected one of the multiple frequencies;

synchronizing the control panel device and peripheral devices using periodic wireless communications and a local clock circuit for each of the control panel device and peripheral devices;

calculating a transmission anticipation time from, a sequence of the multiple frequencies used for communications between the control panel device and peripheral devices, the number of frequencies in the sequence between said selected one of the multiple frequencies and a current transmission frequency of the multiple frequencies, a dwell time of the control panel device and peripheral devices, and a blank time of the control panel device and peripheral devices; and transmitting in response to the transmission anticipation time and an expected activation time of the control panel device, wherein said at least one of the devices relies on a limited power source and the control panel device collects building-security data from the peripheral devices while mitigating power consumption from the limited power source.

2. The method of claim 1, wherein the reducing power consumption is also a function of a sequence of the multiple frequencies and a second selected one of the multiple frequencies.

3. The method of claim 1, further including the step of communicating, between the control panel device and the peripheral devices, data representing a current time index that is used as a reference for establishing communication timings between the devices.

4. The method of claim 3 further including the steps of:

detecting a loss of synchronization between the control panel device and said at least one of the peripheral devices; and increasing a receive activation time of one of the devices in response to the detection.

5. The method of claim 1, wherein said selected one of the multiple frequencies corresponds to an initial frequency for receiving wireless communications from said at least one peripheral device.

6. The method of claim 1, wherein the effecting wireless communications between the control panel device and the peripheral devices is implemented using frequency-hopping spread spectrum.

7. The method of claim 1, further including the step of transmitting messages between the devices wherein the messages use a short frame and a long frame.

8. The method of claim 7, further including the step of transmitting the long frames in packets that contain a number of frames that is an integer multiple of the number of different frequencies of said multiple frequencies.

* * * * *